United States Patent [19]

Dapper et al.

[11] 3,992,101
[45] Nov. 16, 1976

[54] SCANNING OPTICAL SPECTRAL ANALYZER EMPLOYING PLURAL DETECTORS

[75] Inventors: James C. Dapper; Paul A. Niemi, both of Cincinnati, Ohio

[73] Assignee: Cincinnati Electronics Corporation, Cincinnati, Ohio

[22] Filed: Jan. 13, 1975

[21] Appl. No.: 540,531

[52] U.S. Cl. ................................. 356/83; 250/578; 356/73
[51] Int. Cl.² ........................................ G01J 3/30
[58] Field of Search .............. 250/226, 578; 356/73, 356/74, 83, 84, 156

[56] References Cited
UNITED STATES PATENTS

| | | | |
|---|---|---|---|
| 3,460,892 | 8/1969 | Dolin ................................. | 356/83 |
| 3,697,760 | 10/1972 | Biet et al. ........................ | 250/578 X |
| 3,869,212 | 3/1975 | Burcher et al. .................. | 356/83 X |

Primary Examiner—John K. Corbin
Assistant Examiner—F. L. Evans
Attorney, Agent, or Firm—Lowe, King, Price & Markva

[57] ABSTRACT

A scanner having an instantaneous narrow field of view determines spectral and positional information of a point source of optical radiation in a relatively wide field of view. A first optical path includes the scanning means, a dispersion means, and a first detector means so that different wavelengths of the source are convoluted to impinge on the first detector means at different times during a scan of the field of view. A second optical path includes the scanning means, the second detector means, and a narrow bandpass filter for enabling approximately monochromatic energy of the source to impinge on a second detector means displaced from the first detector means. Thereby, a predetermined wavelength is imaged on the second detector means at a time during a scan that differs from the time when that wavelength is imaged on the first detector means, even though the source angular position in the field of view is substantially the same for both of the optical paths. To enable the system to be responsive only to point sources, to the exclusion of nonpoint sources, each of the first and second detector means is divided into a multiplicity of separate, spaced detector elements. Each of the detector elements has a length in the direction of scan no greater than the length of the point source imaged on the first and second detector means. In response to the amplitude of energy impinging on the elements of the second detector means, a signal replica of the convoluted spectral energy impinging on one of the elements of the first detector means is coupled to a signal processing network that recognizes point sources having a predetermined spectral signature and enables the position of the recognized sources to be determined.

36 Claims, 8 Drawing Figures

SCANNING OPTICAL SPECTRAL ANALYZER EMPLOYING PLURAL DETECTORS

FIELD OF INVENTION

The present invention relates generally to apparatus for scanning a field of view to enable spectral information from a point source of optical radiation to be derived, and more particularly, to such apparatus wherein the optical energy is directed by a pair of optical paths to a pair of spaced detector means.

BACKGROUND OF THE INVENTION

In the prior art, there has been developed a device wherein a field of view is scanned to determine spectral and positional information of a point source of optical radiation. The field of view is optically scanned by a scanner having a narrow instantaneous field of view to sequentially direct radiation from different scanned portions of the field onto a single detector included in an image plane of the radiation. An optical dispersion means for the radiation is provided in a first optical path that includes the scanning means and the detector. A second optical path between source and detector includes a scanning means, but does not include the dispersion means. The dispersion means and the scanning means cause a convolution of spectral energy from the source on the image plane, resulting in a displacement of the relative occurrence times, during a scan, of a wavelength of the radiation as it impinges on the image plane via the two optical paths.

The optical scanner includes a multiplicity of focusing lenses that rotate together, about a fixed, centrally located detector. In the path of only one of the lenses, the dispersion means is provided to enable the spectral analysis to be performed. The remaining lenses enable the angular position of the source in the field of view to be determined. Determining the source position establishes a reference time during the portion of a scan while the dispersion means rotates in the field of view. The established reference time enables a correlation between spectral position and time to be made in the output of the detector while the dispersion means is in the field of view so that an amplitude versus time output of the detector can be correlated with amplitude versus wavelength response to the point source.

With the prior art system, it is difficult to establish a time position for the source while the dispersion prism is being rotated through the field of view of the detector. Also, the prior device does not provide for scanning in two orthogonal directions. A further problem with the prior art device is that it is incapable of distinguishing between point sources and nonpoint sources of optical radiation. As a result, nonpoint sources are susceptible of being processed as ponint sources, resulting in inaccurate amplitude versus spectral responses.

BRIEF DESCRIPTION OF THE INVENTION

In accordance with the present invention, the prior art device is modified to overcome the foregoing problems by providing first and second displaced optical detector means for imaged radiation from the point source being monitored. The first and second detector means are respectively provided in first and second optical paths that are substantially simultaneously established with a scanner having an instantaneous narrow field of view. In the second optical path, a narrow bandpass filter is provided to estalbish a reference time position for a predetermined wavelength, i.e., substantially monochromatic energy, of the source. In the first optical path a dispersion means, such as a prism, is provided so that different wavelengths of the source are convoluted onto the first detector means at different times during a scan of the field of view. As a result of the displacement of the two detector paths, there is a difference in the time the predetermined wavelength impinges on the first and second detector means. The time difference is a function of the displacement of the two detector means, as well as the scanning speed and the properties of the dispersion means, all known factors making it possible to establish the time when the predetermined wavelength is imaged on the first detector means. By knowing when the predetermined wavelength is imaged on the second detector means, the amplitude versus wavelength characteristics of the point source imaged on the first detector means can be obtained.

To enable the present apparatus to distinguish between point sources of radiation and nonpoint sources, each of the first and second detector means includes a multiplicity of separate, spaced detector elements having corresponding geometric configurations. Each of the detector elements has an area no greater than the size of the point source image cast on the first and second detector means. In accordance with one preferred environment, the detector elements are arranged in a straight line having a relatively high (e.g. 10 to 1) length to height ratio. The relative amplitude of the energy impinging on the elements of the second detector means, i.e., the elements in the optical path including the narrow bandpass filter, is detected and compared with criteria which establish the existence of the point source. In response to the point source criteria being met, the signal from the element of the first detector means corresponding with the element of the second detector means which is indicated as meeting the point source criteria is passed to a signal processor. The signal processor includes means for enabling a particular type of point source to be distinguished from other types of point sources, and is preferably of a type disclosed in the copending application of David E. Schmit, and Frank Wedig, entitled Waveform Recognition Circuit, commonly assigned with the present invention. The position of the distinguished point sources, in a pair of orthogonal coordinates, is determined.

It is, accordingly, an object of the present invention to provide a new and improved scanning optical spectrometer.

Another object of the invention is to provide a new and improved orthogonally scanned point source optical spectrometer having a relatively narrow instantaneous field of view.

A further object of the invention is to provide a scanning optical spectrometer having an instantaneous narrow field of view wherein positional and amplitude versus spectral information are derived during the same scan portion.

An addition object of the invention is to provide a scanning optical spectrometer having a narrow instantaneous field of view wherein the time position of a predetermined wavelength of a point source being detected is established during the same scan portion as that utilized to derive an amplitude versus spectral response for the point source.

A further object of the invention is to provide an optical scanning spectrometer having a narrow instantaneous field of view wherein point sources and nonpoint sources of radiation are distinguished from each other.

The above and still further objects, features, and advantages of the present invention will become apparent upon consideration of the following detailed description of several specific embodiments thereof, especially when taken in conjunction with the accompanying drawing.

DETAILED DESCRIPTION OF THE DRAWING

Figure 1:
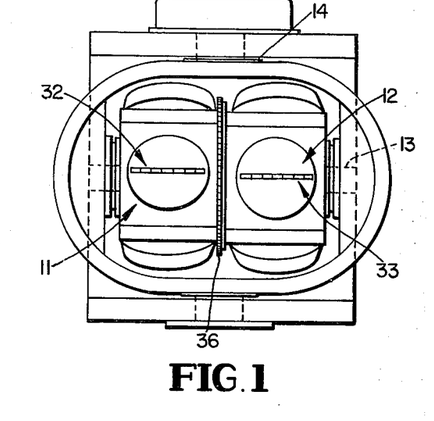
FIG. 1 is a front view of one embodiment of an optical scanner in accordance with the present invention.
Figure 2:
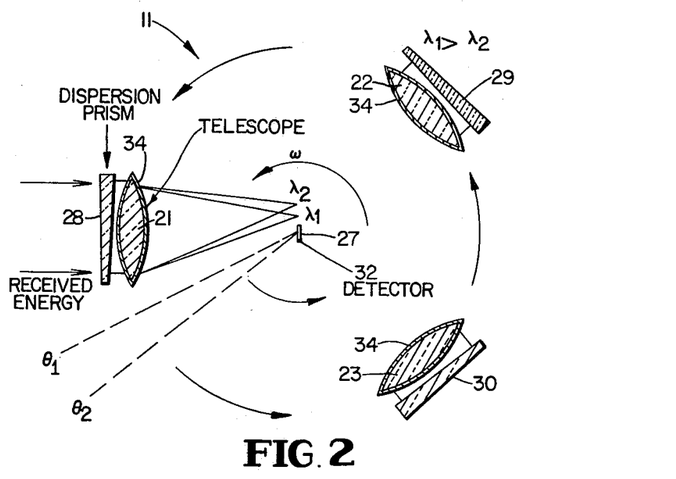
FIG. 2 is a side, sectional, schematic view of a portion of the optical scanner illustrated in FIG. 1.
Figure 3:
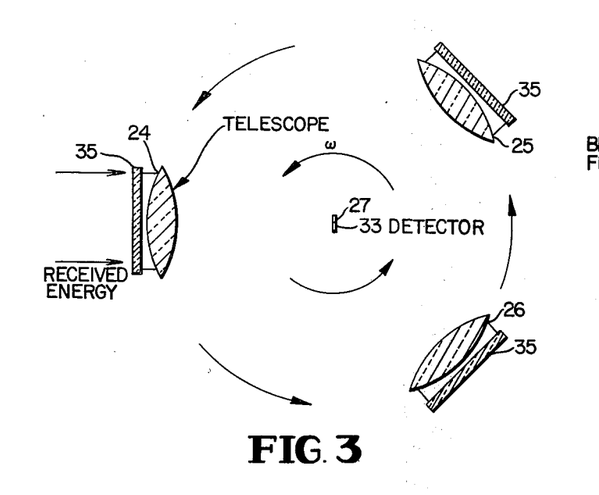
FIG. 3 is a side, sectional, schematic view of another portion of the scanner illustrated in FIG. 1.

Reference is now made to FIGS. 1–3 of the drawing wherein there are illustrated a pair of optical systems 11 and 12 for orthogonally scanning a relatively wide field of view. Systems 11 and 12 have radiation patterns with narrow instantaneous fields of view that are responsive to substantially the same images at any instant of time. Optical systems 11 and 12 are scanned together in elevation and azimuth by being connected to common horizontally and vertically mounted drive shafts 13 and 14. Drive shafts 13 and 14 are connected to suitable motors and gearing arrangements, whereby optical systems 11 and 12 are driven through any desired field of view at a constant rate. A typical field of view extends 80° in elevation and ±180° in azimuth, or continuous 360° azimuth rotation.

Optical systems 11 and 12 substantially simultaneously scan the same field of view, as they have aligned optical axes and substantially the same pointing direction. Each of optical systems 11 and 12 includes three focusing lenses 21–26 that rotate about shaft 13 to provide elevation scan. Azimuth scan is obtained by rotating lenses 21–26 together in response to shaft 14 being driven. The lenses of optical systems 11 and 12 are equispaced from a centerline 27 that is coincident with the center of drive shaft 13. Each of lenses 21–26 subtends approximately the same arc length and is displaced 120° about centerline 27 from its adjacent lens. Fixedly mounted for rotation with focusing lenses 21–23 are dispersion prisms 28–30, respectively. In contrast, there is no dispersion prism associated with any optical paths including lenses 24–26.

Mounted along centerline 27 are fixed, optical radiation, planar photo detector means 32 and 33, which are respectively provided for optical systems 11 and 12. Mounted in the path of detector means 32 are broadband optical filters 34, each of which is formed as a coating on lenses 21–23 and passes substantially all expected radiation from point source images of interest, and that rejects all other portions of the optical spectrum. Mounted in the path of detector means 33 are three narrow bandpass optical filters 35, each of which is mounted to rotate with a different one of lenses 24 – 26 and enables substantially only monochromatic radiation from a point source of interest to be imaged on detector means 33.

Dispersion prisms 28–30 of optical system 11 cause a differential deflection of different wavelengths focused by lenses 21–23 on detector means 32 as the optical system rotates about centerline 27. In response to the boresight axis of the optical path of lens 21 being normal to the planar face of detector 32, as illustrated in FIG. 2, two monochromatic wavelengths $\lambda_1$ and $\lambda_2$ of the source are deflected by prism 28 so that neither impinges on the face of the detector, assuming that the detector has a relatively low height. The shorter wavelength, $\lambda_2$, is deflected by a greater amount than the longer wavelength, $\lambda_1$. As optical system 11 rotates in the counterclockwise direction and reaches an angular position, $\theta_1$, the point source wavelength $\lambda_1$ impinges directly on the face of the detector 32. As optical system 11 continues to rotate and reaches a further angular position, $\theta_2$, the shorter wavelength radiation, $\lambda_2$, impinges directly on the face of detector 32. The output of detector 32 for the wavelengths $\lambda_1$ and $\lambda_2$ is illustrated by the two time displaced peaks of FIG. 4a.

There is no substantial differential deflection of the different wavelengths from the point source while it propagates through optical system 12. Thereby, in response to the optical axis of one of the lenses 24–26 being normal to the face of detector 33, maximum output is derived from the detector. Theoretically, the output of detector 33 for all wavelengths of the point source should occur simultaneously. Practically, however, there is some spreading of the point source image on detector 33 and narrow band filter 35 is provided to enable the detector to be responsive to only monochromatic energy at a predetermined wavelength of the source, e.g., $\lambda_1$.

Figure 4A:
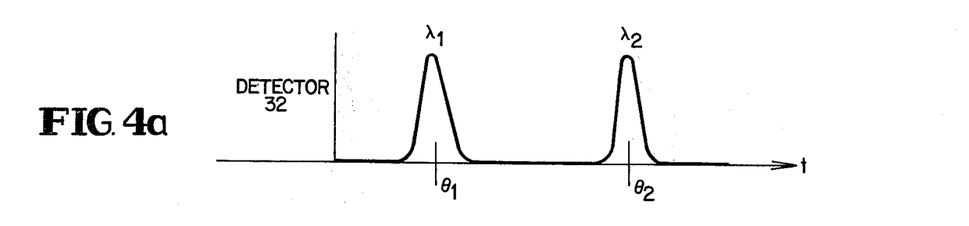
FIGS. 4a and 4b are waveforms illustrating the nature of signals derived from detectors included in FIGS. 2 and 3 in response to monochromatic images.
Figure 4B:
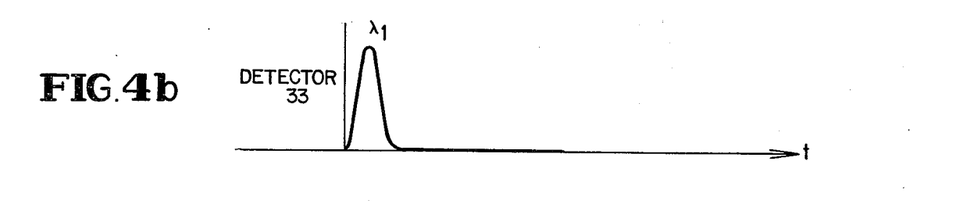

The response of detector 33 to energy at $\lambda_1$ occurs prior to the output of detector 32 for the same wavelength as illustrated by the relative time positions of the pulses in FIGS. 4a and 4b for the responses of detectors 32 and 33. The signal derived from detector 33 establishes a time reference position for the predetermined wavelength to enable time positions of the output of the detector 32 to be correlated with wavelength so that the amplitude versus time output of detector 32 provides an amplitude versus wavelength indication of the point source imaged on detectors 32 and 33.

To provide a necessary delay in processing of the image detected by detector 33 relative to the image detected by detector 32, it is necessary to have the geometric axes of systems 11 and 12 slightly displaced from each other. Differential displacement of the optical axis of systems 11 and 12 is accomplished by providing a gearing arrangement 36 between the two optical systems, whereby the axes of lenses 24, 25 and 26 are respectively below the axes of lenses 21, 22 and 23 so that the same field of view is imaged on lenses 24–26 prior to being imaged on lenses 21–23. Adjustment of the geometric axis of optical system 12 relative to system 11 assures that the gain of a variable amplifier (described in detail infra) is stabilized in response to the intensity of the image illuminating detector 33 prior to that same image illuminating detector 32.

To enable point sources to be distinguished from nonpoint sources, detector means 32 and 33 are actually formed as seven separate, spaced, detector elements forming arrays having corresponding geometric configurations; each of the elements extends vertically in the direction of scan for a distance substantially equal to, but not greater than, the vertical length of a point source image on detector means 32 and 33. The elements of detector means 32 and 33 are topologically arranged so that like positioned elements of the two detector means are simultaneously responsive to the same instantaneous field of view of the entire scanned region; e.g., if a particular target is imaged only on the center element of detector 32 the same target is imaged only on the center element of detector 33. The preferred geometric configuration of detector means 32 and 33 is a straight line having a relatively large horizontal to vertical aspect ratio and with very close spacing between adjacent horizontal elements. Typically, the total length and height of each of the detectors in arrays 32 and 33 are respectively 10 milliradians and 1 milliradian to provide an aspect ratio of 10:1; a point source image on the detectors extends 1 milliradian in the horizontal and vertical directions. The 10:1 aspect ratio is a compromise between resolution and the amount of processing electronics. For maximum resolution each of the detector elements has a length of 1 milliradian in both the horizontal and vertical directions. However, such a resolution generally increases the amount of processing electronics to an impractical extent. In response to the amplitude of energy impinging on the separate elements of detector array 33, a decision is made as to whether a point source is in the field of view. If it is decided that a point source is in the field of view, a determination is made of the element or elements in array 33 on which the point source is imaged. Radiation from the element in array 32 corresponding with the element in array 33 which is responsive to the point source image is passed to a signal processing network where it is compared with stored signatures of point sources of interest.

Criteria for determining if a point source is being detected are established by detecting the radiation levels of the outputs of the elements of detector array 33. In particular, if radiation is received on more tha two adjacent elements of detector 33 simultaneously, an indication is provided that the imaged radiation is not a point source. Because the length of each of the detector elements in the horizontal direction is greater than the size of the point source image, radiation from a point source cannot simultaneously impinge on more than two adjacent elements simultaneously; radiation from a point source can impinge on a pair of adjacent elements because it can be imaged partly on each, e.g., if a point source is imaged between the adjacent elements. In response to only a pair of adjacent elements simultaneously having radiation imaged thereon, a decision is made as to the element that is responsive to the greatest amount of energy. The element of array 33 which is responsive to the greatest amount of energy is indicated as being primarily responsive to the point source and the signal from the corresponding element of array 32 is coupled to the processing network.

The linear relation of the elements in detector arrays 32 and 33 enables a point source determination to be made in the azimuth plane. To determine the existence of a point source in the elevation plane, the output signals of the elements in detector 33 are compared against a time reference. In response to the output of one of the elements being in excess of a predetermined duration, an indication is provided that the particular element is not responsive to a point source because the size of the image is greater than the time required for a point source to pass the element. If the duration of the signal derived from one of the elements of array 33 is less than a predetermined time, that signal is not accepted as a point source image, but is regarded as noise.

Figure 5:
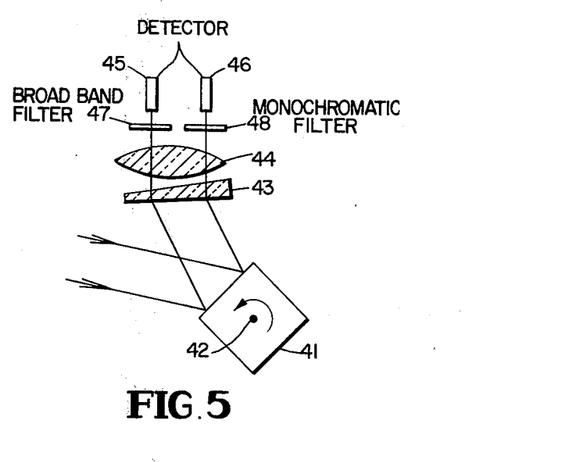
FIG. 5 is an optical schematic view of a further optical scanning spectrometric analyzer utilizing the principles of the present invention.

In accordance with the principles of the invention, the apparatus illustrated by FIGS. 1–3 can be modified as schematically illustrated in FIG. 5. In the optical system of FIG. 5, scanning in the elevation plane is provided by a single rotating, reflecting polygon, shown as cube 41, having four mutually orthogonal, planar reflecting faces which are rotated about a horizontal axis 42. Azimuth plane scanning is provided by rotating the cube about a vertical axis. Optical radiation from a point source in the field of view is reflected from the faces of cube 41 and imaged via a dispersion prism 43 and focusing lens 44 on the displaced, planar faces of fixed radiation detector means 45 and 46. Positioned between lens 44 and detector means 45 is a broadband filter 47, while a substantially monochromatic filter 48 is positioned between focusing lens 44 and detector means 46. Filter 47 and detector 45 thereby function, in combination with scanning cube 41 and prism 43, to produce the same result as is achieved by optical system 11, while scanning cube 41, dispersion prism 43, lens 44, monochromatic filter 48, and detector 46 effectively produce the same result as is achieved by optical system 12. The same result is achieved through the optical path including filter 48 as is achieved by optical system 12, even though optical system 12 does not include a dispersion prism in its ray path and the ray path including filter 48 includes a dispersion prism because detector 46 is responsive to only a single wavelength of the source. There is a predetermined displacement in the time interval, due to the known spatial displacement of detectors 45 and 46, when a predetermined wavelength $\lambda_1$ impinges on the faces of detectors 45 and 46 which enables the occurrence time of the output of detector 45 to be correlated with wavelength. Detectors 45 and 46 respectively derive waveforms as indicated by FIGS. 4A and 4B in response to monochromatic energy at wavelengths $\lambda_1$ and $\lambda_2$ to provide the same result as is achieved by optical systems 11 and 12.

To enable the scanner of FIG. 5 to distinguish between point sources and nonpoint sources, each of detector means 45 and 46 is preferably fabricated as a multi-element array as described for FIGS. 1–3. The several elements of detector arrays 45 and 46 have similar, linear geometry, with the different detectors being located in a plane extending in the same direction as axis 42 about which cube 41 rotates.

Figure 6:
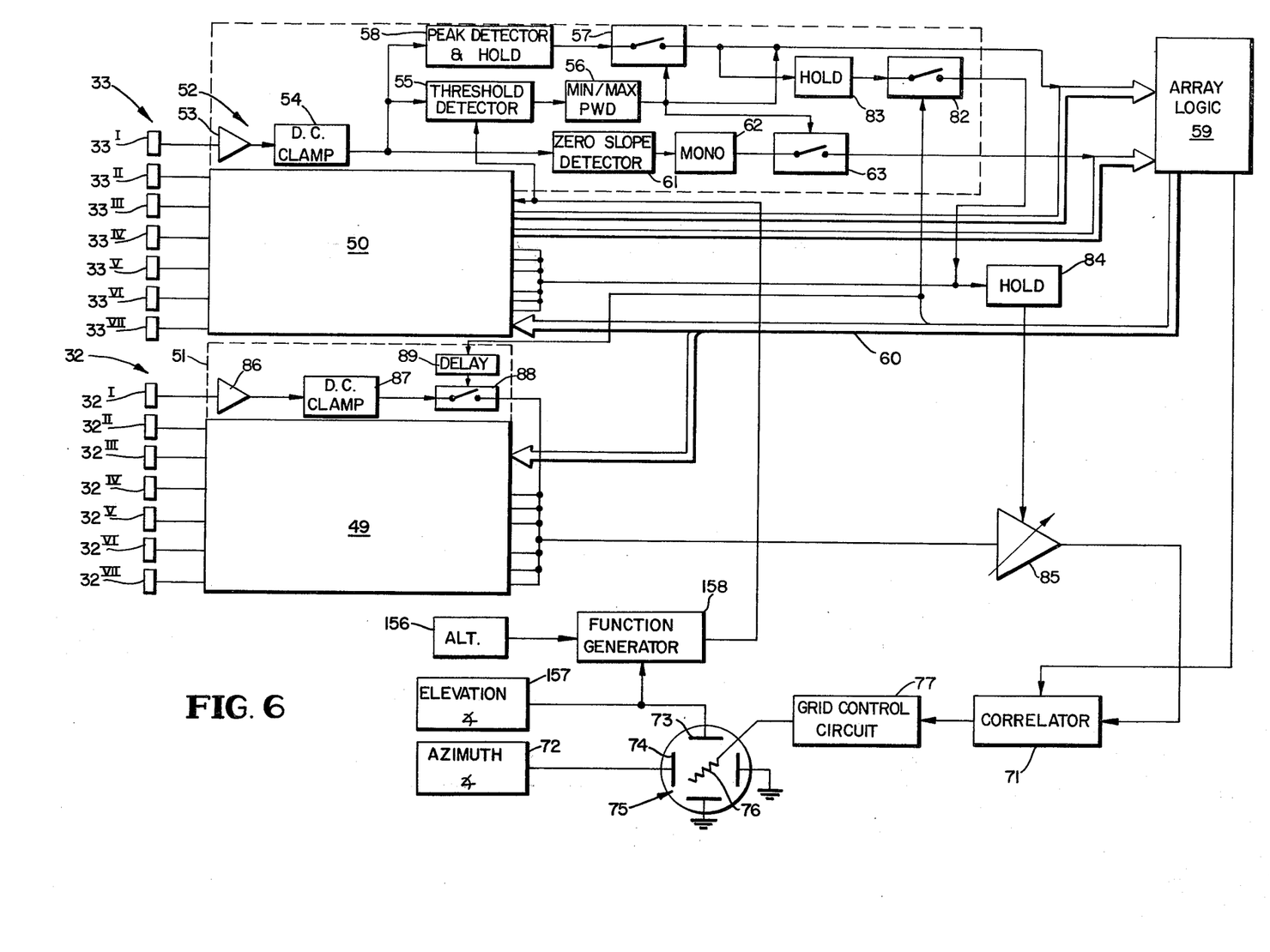
FIG. 6 is a schematic block diagram of one embodiment of processing electronics in accordance with the present invention.

Reference is now made to FIG. 6 of the drawing wherein there is illustrated, in schematic and block diagram form, one embodiment of the processing responsive to the outputs of the detector arrays 32 and 33 of FIGS. 1–3 or arrays 45 and 46 of FIG. 5. Output signals of detector arrays 32 and 33 are coupled to a plurality of channels 49 and 50 having virtually identical circuit configurations, whereby the circuit configuration of only the channel 51, responsive to one of the elements 32' of array 32, and the circuit elements of channel 52, responsive to the output of one of the elements 33' of array 33, are illustrated in detail. Each of the remaining channels 49 responsive to the other elements of array 32 is identical to channel 51, while each of the remaining channels 50 responsive to the other elements of array 33 is identical to channel 52.

Broadly, channel 52 responds to the radiation imaged on element 33$^I$ to determine if the imaged energy is above a predetermined threshold level, and whether or not that threshold level has been exceeded for a window in excess of a predetermined minimum time duration and for a period less than a predetermined maximum duration. In response to the signal exceeding the threshold for a time period within the window, an indication is provided that element 33$^I$ is responsive to a point source in the elevation plane. To determine if the source being imaged on element 33$^I$ is a point source in the azimuth plane, the responses from the two adjacent elements 33$^{II}$ and 33$^{III}$ of array 33 are detected to determine if they are simultaneously responsive to sufficient energy to exceed the threshold level for a period within the window. If elements 33$^I$ and 33$^{II}$ only are simultaneously responsive to radiation, the element receiving the greatest amount of energy is indicated as the element responsive to the energy.

To these ends, channel 52 includes a DC preamplifier 53, having its input terminals directly responsive to the output signal of element 33$^I$. Amplifier 53 derives an output signal that is coupled to DC clamp 54, which derives a restored to ground video output signal that is utilized for processing.

The output signal of clamp 54 is applied to a threshold detector 55. If the scanner of the invention is mounted on an aircraft that is monitoring the earth for point source detection, the threshold of detector 55 is a variable amplitude that is a function of aircraft altitude and the elevation angle of the instantaneous field of view of optical systems 11 and 12. By combining indications of the altitude and elevation angle of the detector system, the slant range between the detector and a radiation source on the ground is determined whereby the sensitivity of the system is varied as a function of total distance between an imaged area and the optical system. To establish the variable threshold level for detector 55 there is provided an altimeter 156 which derives a DC analog signal directly proportional to altitude (h). Elevation transducer 157, which may be in the form of a potentiometer wiper that is moved in synchronism with the rotation of lenses 24–26 about axis 27, is provided for deriving a DC analog voltage directly proportional to the elevation angle ($\alpha$) of the instantaneous field of view imaged on detector array 33. The output signals of altimeter 156 and elevation angle transducer 157 are combined in function generator 158, which derives a DC output signal having a magnitude representing sensitivity. Sensitivity is calculated as an inverse function of slant range squared $1/_R2$ from $(\sin \alpha/h)^2$.

A signal directly proportional to the amplitude of the output signal of function generator 158 is compared with the output signal of DC clamp 54 in threshold detector 55. In response to the output of clamp 54 exceeding the threshold applied to detector 55 by function generator 158, the threshold detector derives a binary one signal.

The output signal of threshold detector 55 is applied to pulse width detector 56. Pulse width detector 56 determines if the binary one output of threshold detector 55 is derived for a window in excess of a predetermined minimum duration and for less than a predetermined maximum duration. In response to threshold detector 55 deriving a signal falling within the window, pulse width detector 56 derives a binary one level simultaneously with the end of the window. If the threshold of detector 55 is exceeded for a duration less than the minimum of the window, the signal detected by element 33$^I$ is discarded as noise; if the threshold is exceeded for more than the maximum window, the detected signal is discarded as not being a point source in the elevation plane.

The binary one output signal of pulse width detector 56 controls the coupling of additional signals generated in response to the output of DC clamp 54 to circuitry that considers the point source criteria in the azimuth plane. In particular, the output of detector 56 is coupled as a control input to normally open switch 57, having an analog input responsive to an output signal of peak detector and hold network 58. Peak detector and hold network 58 is responsive to the output signal of DC clamp 54, whereby network 58 derives an analog signal level that is directly proportional to the maximum output signal of clamp 54 during the window. In response to the output signal of threshold detector 55 being at a binary one level for the window defined by pulse width detector 56, the peak signal derived from network 58 is coupled through switch 57 to array logic network 59, where the criteria for an azimuth point source are stored by a hardware logic network.

The binary one level derived from pulse width detector 56 also controls coupling to array logic network 59 of a signal having a time position indicative of the time when the peak detected by network 58 is derived from DC clamp 54. To these ends, the output signal of DC clamp 54 is applied to zero slope detector 61 which derives a short duration pulse substantially in time coincidence with a peak, zero slope waveform being derived from DC clamp 54. The pulse derived from detector 61 triggers monostable multivibrator 62, which derives a binary one level for a predetermined time interval. For a point source, the trailing edge of the binary one level derived from monostable multivibrator 62 always occurs during the interval while a binary one signal is derived from pulse width detector 56. The trailing edge of the output of monostable multivibrator 62 is selectively coupled through normally open switch 63 to array logic 59 if it occurs while a binary one level is derived from pulse width detector 56, by virture of the output of the pulse width detector being applied as the control input to switch 63.

Network 59 responds to the signals coupled to it by channel 52, as well as the remaining channels 50, to determine if a point source is imaged on the elements of array 33. In response to the point source criteria being met, array logic network 59 compares the signals coupled to it from the peak detector and hold network 58 of each of channels 50 to determine which of the channels 50 detected the highest peak amplitude. In response to the indicated peak, array logic network 59 supplies a binary one output signal to one of leads 60, one of which is provided for each of channels 50. The presence and absence of signals on leads 60 controls coupling of the signal from one of the elements of array 32 to variable gain amplifier 85, as well as controlling the gain of the amplifier in accordance with the maximum peak level detected by one of the elements of array 33.

To these ends, channel 52 includes a normally open switch 82 which is controlled by the signal on lead 60' for channel 52, whereby a binary one on lead 60' closes switch 82 of channel 52 to pass a signal having a magnitude equal to the maximum detected peak of detector element 32'. None of switches 82 of the other channels 50 is closed while the switch of channel 52 is closed because only one of leads 60 has a binary one on it at a time. To enable the maximum peak to be passed through switch 82 even though switch 82 is closed after the peak has terminated and is no longer being coupled through switch 57, there is provided an analog hold or storage circuit 83 responsive to the analog signal coupled through switch 57. The output terminals of each of switches 82 of channels 50 are connected together and to a further analog storage circuit 84 that drives a gain control input terminal of variable gain amplifier 85, the gain of which varies directly with the output of storage circuit 84. The gain of amplifier 85 is thereby set at a level commensurate with the peak level of the point source energy impinging on the elements of detector array 33 and is normalized for different maximum radiation levels imaged on array 33. Because of the differential angle between the axes of lenses 24–26 relative to lenses 21–23, the gain of amplifier 85 is stablilized prior to any signal being applied to the signal input of the amplifier.

After the gain of amplifier 84 has been set, the signal input of the amplifier responds to the channel 49 that corresponds with the channel 50 that is responsive to the element of array 33 on which the greatest energy level impinges. The exemplary channel 51 of channels 49 includes a DC amplifier 86, having an input responsive to element $32^I$ and an output which drives a DC clamping circuit 87. Clamp 85 derives a time varying ground referenced signal that is a replica of the convoluted energy impinging on element $32^I$ The output signal of DC clamp 87 is applied to an input of analog switch 88, having a control terminal connected to be driven in parallel with the control terminal of switch 82. The channel 49 having a closed switch 88 corresponds with the channel 50 having a closed switch 82. The output terminal of each of the switches 88 is connected to a common point that is connected to the other input terminal of amplifier 85. To enable the output of clamp 87 to be applied to the signal input terminal of amplifier 85 after the amplifier gain has been set by the output of circuit 84, delay circuit 89 is connected between lead 60 and the control input of switch 88. Energy is imaged on arrays 32 and 33 from the same point source at sufficiently displaced times such that the convoluted point source energy imaged on an element of array 32 is always passed through switch 88.

A normalized time varying replica of the convoluted energy representing amplitude versus spectral content of the imaged point source is derived as the output signal of amplifier 85. The output of amplifier 85 is applied to a correlation circuit 71 that preferably is of a type disclosed in the aforementioned copending application of Schmit and Wedig. Correlator 71 includes circuitry for matching the output signal of amplifier 85 with stored signals indicative of a desired point source image to be recognized. To provide clocking of the stored point source image relative to the time position of the monochromatic point source imaged on the elements of detector array 33, correlator 71 includes a further input, derived from array logic 59. Correlator 71, in effect, compares the spectrum of the energy impinging on one of the elements of array 32 with a stored spectrum. In response to the stored spectrum corresponding with the detected spectru, correlator 71 derives a relatively short duration output pulse.

The output pulse of correlator 71 is combined with signals indicative of the azimuth and elevation angles of the instantaneous field of view of the optical scanner. The azimuth angle is derived by providing an appropriate position transducer 72 for shaft 14 in the azimuth plane. Transducer 72 may take the form of a linear potentiometer which derives a DC output voltage indicative of azimuth angle of the instantaneous field of view at any instant of time. The signals respectively derived from elevation and azimuth transducers 157 and 72 are applied to the vertical and horizontal deflection plates 73 and 74 of cathode ray tube 75. Cathode ray tube 75 includes a control grid 76 which is normally biased by control circuit 77 to blank the tube electron beam. In response to a pulse being derived from correlator 71, the blanking bias applied by circuit 77 to grid 76 is overcome, the beam is unblanked and impinges on the face of cathode ray tube 75. The beam impinges on the tube face at a position determined by the voltages applied to vertical and horizontal deflection electrodes 73 and 74, thereby to indicate to an operator the position of a detected point source having the spectral characteristic stored in correlator 71.

As an alternative, to provide better rejection against false alarms, the outputs of elevation and azimuth transducers 157 and 72 are applied to cathode ray tube 75 only after the same target has been detected on two consecutive scans. To this end, the outputs of transducers 157 and 72 may be applied to a storage means during each scan. In response to the transducers 157 and 72 deriving approximately the same outputs during the next scan, the stored signals are read out from the storage means to plates 73 and 74. If, during the next scan, transducers 157 and 72 derive output signals that materially differ from the signals derived during the first scan, the stored signals from the first scan are erased because they are considered as originating from a source that is not of interest, e.g., noise.

Figure 7:
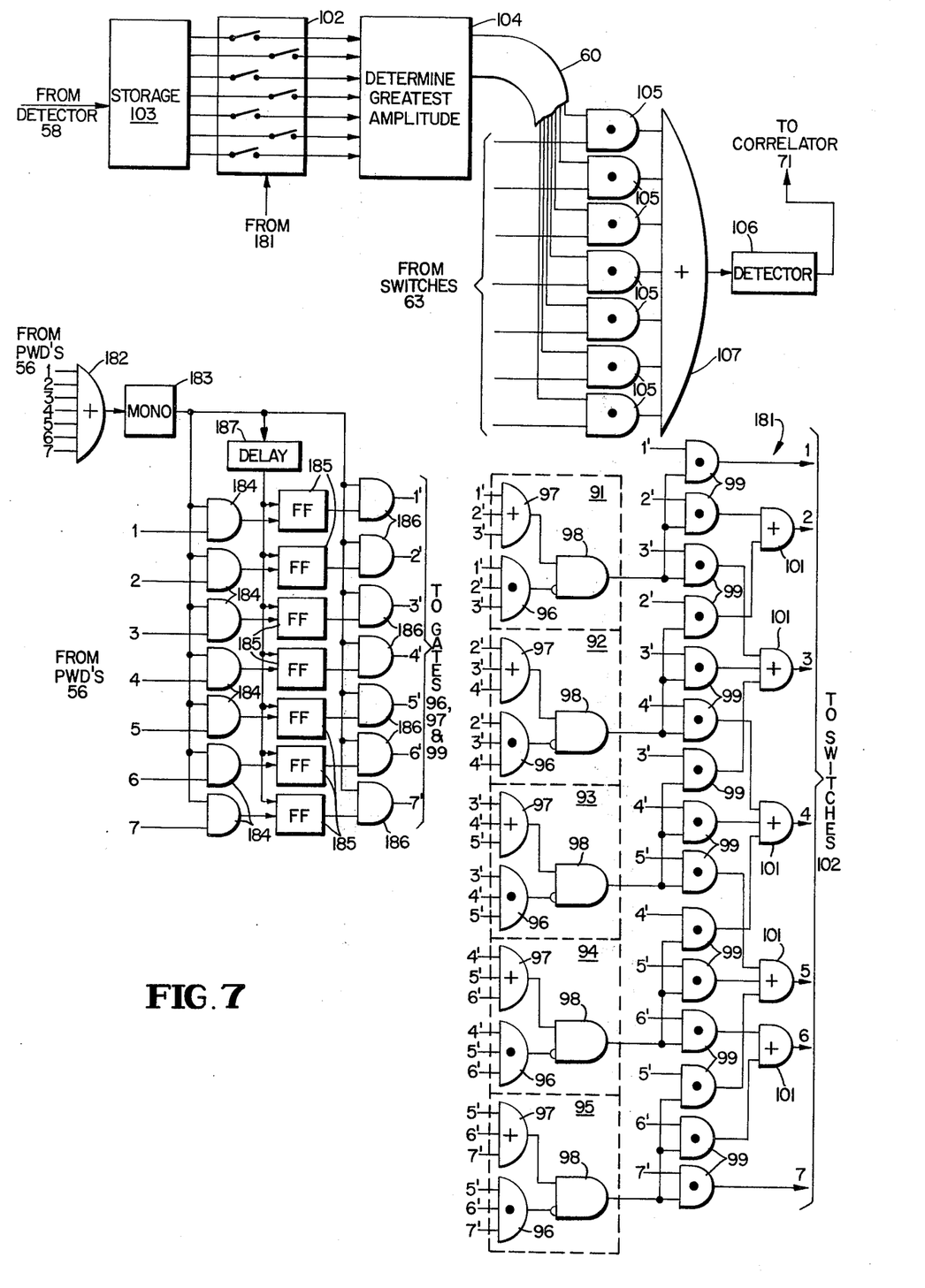
FIG. 7 is a block diagram of array logic circuitry included in the processing electronics of FIG. 6.

Reference is now made to FIG. 7 of the drawing wherein there is illustrated, in circuit and partially block diagram form, the apparatus included in array logic network 59. It is to be recalled that the basic function of array logic network 59 is to determine if a point source in the azimuth direction is being imaged on the elements of detector array 33; if a point source is being imaged, network 59 determines which element in detector array 33 is responsive to the most energy from the point source and derives an output pulse that is time synchronized with that element being responsive to the point source. The output pulse is applied to correlator 71 simultaneously with the wavelength passed through filter 35 to detector means 33 being derived at the output of amplifier 85 to provide the correlation between the time of the output waveform of the amplifier and wavelength of the imaged point source.

To these ends, the output signals of pulse width detectors 56 of channels 50 responsive to the elements of array 33 are combined in logic network 181 which determines if a point source is being received by detector array 33 and on which of the element or elements of the array the point source is being imaged. It is possible for a single point source to be imaged on a pair of elements of the detector array. It is also possible for plural point sources to be imaged on several nonadjacent elements of array 33 simultaneously, in which case the apparatus of FIG. 7 selects the point source having the greatest intensity. If, however, a nonpoint source is imaged on the elements of array 33, it is presumed that more than two adjacent elements of the array are simultaneously illuminated thereby. Logic network 181 responds to the output signals of pulse width detectors 56 to determine if there is one or more point sources imaged on the elements of detector 33, and indicates on which of the elements the point source is being imaged.

The pulse width detectors 56 of channels 50 are susceptible of deriving pulses having leading edges that are slightly displaced from each other as detector array 33 is scanned across substantially the same portion of the field of view at any instant. To prevent the channel 50 which initially derives a pulse from necessarily being indicated as being associated with a point source, it is necessary to determine if any of the other pulse width detectors derives a binary one output signal within a relatively short, predetermined time interval after the initial pulse width detector is activated into the binary one state. To this end, the output signals of the pulse width detectors 56 of each of channels 50 are combined in OR gate 182, having an output which is coupled to an input of monostable multivibrator 183. In response to the leading edge of a binary one signal from OR gate 182, monostable multivibrator 183 generates a binary one level for a relatively short time interval. The binary one level is applied in parallel to enable AND gates 184, one of which is provided for each of channels 50. Each of AND gates 184 includes a second input terminal, responsive to the output signal of pulse width detector 56 for its particular channel. Thereby, if a binary one level is derived from monostable 183 while a pulse width detector 56 of a second channel is deriving a binary one level, the binary one level of the second channel is passed through the AND gate 184 provided for that channel.

The output signal of each of AND gates 184 is coupled to a set input terminal of different flip-flops 185, one of which is provided for each of channels 50. Thereby, the flip-flops 185 which are activated to the set state are those which correspond with the channels 50 from which a binary one signal is derived from pulse width detector 56 during the interval while monostable 183 is deriving a binary one level. To assure activation of the flip-flop 185 which is responsive to the channel 50 that is connected to the detector that initially responds to radiation from the source, a very slight delay (not shown) is provided at the input of each of AND gates 184 from the output of pulse width detectors 56 of channels 50. In response to monostable 183 timing out, the states of flip-flops 185 are examined by connecting the output terminal of each of the flip-flops 185 to one input of different AND gates 186, one of which is provided for each of the flip-flops. AND gates 186 are also responsive to the trailing edge of the output of monostable 183, and are enabled in response to the trailing edge. Immediately after the state of each of flip-flops 185 is coupled through AND gates 186, as a binary one or zero level, the flip-flops are activated to the reset state in response to the trailing edge of the output of monostable 183, that is coupled to the reset inputs of flip-flops 185 through delay circuit 187.

The binary one levels derived from AND gates 186 are coupled to logic network 181 which identifies the detector element or elements that are responsive to a point source image. Logic network 181 includes an array of AND, OR and inhibit gates which enable a binary one signal to be derived in response to radiation impinging on a single one of the elements of array 33, a pair of adjacent elements of array 33, but not in response to three adjacent elements of array 33 being irradiated. In particular, five logic networks 91-95 are provided and each is responsive to a triad of signals from three adjacent channels, as derived from AND gate 186; the channels bear the nomenclature of channels 1–7 for the seven elements of array 33. In particular, network 91 is responsive to the signals from channels 1, 2 and 3; network 92 is responsive to the signals from channels 2, 3, and 4; network 93 is responsive to the signals from channels 3, 4, and 5; network 94 is responsive to the signals from channels 4, 5, and 6; and network 95 is responsive to the signals from channels 5, 6, and 7. Each of networks 91-95 includes an AND gate 96 and an OR gate 97, each of which is responsive to the three inputs to the network. The output signal of OR gate 97 is applied to an enable input terminal of inhibit gate 98, that includes an inhibit terminal responsive to the output of AND gate 96. Thereby, inhibit gate 98 derives a binary one level in response to one or two of the three inputs applied to network 91 being in a binary one state, but not in response to none or all three of the inputs to the network being in a binary one state.

The output signal of each of logic networks 91-95 functions as an enable input for three AND gates 99; one of gates 99 for each of networks 91-95 is separately responsive to the output signals of AND gates 186 for each of the three channels applied to the network. The output signals of AND gates 99 for channels 2–6 are combined in OR gates 101, one of which is provided for each of channels 2–6. For channels 1 and 7, the output signals of the AND gates 99 function directly as output signals. Thereby, there are derived seven different binary signals having binary levels indicative of which of the elements in array 33 are responsive to a point source image.

The output signals of network 181 are applied in parallel as control signals to close normally open analog switches 102, one of which is provided for each of channels 50. The signal coupled through analog switch 57 of each of channels 50, indicative of the peak energy level detected by the detector element connected to the channel, is applied to a separate analog storage circuit 103. One analog storage circuit 103 is provided for each of the seven channels, and has an output that is coupled to the input terminal of each of switches 102. Only those switches 102 which are responsive to detector elements on which a point source is imaged are activated to the closed state in response to the output of network 81.

Because a point source can be imaged on a pair of adjacent elements of array 33 substantially simultaneously, or plural point sources can be substantially simultaneously imaged on multiple, nonadjacent elements of energy of array 33, it is necessary to provide a further criteria to determine the point source of greatest interest. In the present invention, it is assumed that the detector element receiving the most energy from a point source is responsive to the point source of interest. To detect the element receiving the greatest amount of point source energy, the output signals of analog switches 102 are applied to comparison network 104 which includes circuitry for comparing the relative amplitudes of the inputs applied to it by one or more of switches 102. In addition, network 104 includes seven output terminals, one for each of the channels 50, on only one of which is derived a binary one level to indicate which of its input signals is of greatest amplitude. The output signal leads of network 104 are coupled back to channels 49 and 50, as leads 60, thereby to enable the switches 82 and 88 of the channels 49 and 50 corresponding with the channel 50 on which the binary one level is derived from network 104.

To establish the reference time position for indicating when the most energy of the predetermined wavelength was imaged on one of the elements of array 33, the output leads of network 104 are applied as enable signals to AND gates 105, one of which is provided for each of the channels 50. A second input to each of AND gates 105 is derived from the output of monostable 62 for the corresponding channel 50 of the AND gate. Thereby, one of AND gates 105 derives a binary one level having a trailing edge that is precisely fixed relative to the time when the channel which was irradiated by the greatest amount of point source energy responded to a peak amplitude. This trailing edge is coupled to trailing edge detector 106 by OR gate 107, having inputs responsive to each of the outputs of AND gate 105. Detector 106 derives an output pulse that is precisely timed relative to the time at which th monochromatic energy of greatest amplitude impinges as a point source on one of the elements of array 33. The output signal of detector 106 is applied as an input to correlator 71 to enable the spectral content of the point source imaged on the corresponding element of array 32 to be detected.

While there have been described and illustrated several specific embodiments of the invention, it will be clear that variations and details of the embodiments specifically illustrated and described may be made without departing from the true spirit and scope of the invention as defined in the appended claims. For example, the array logic network of FIGS. 6 and 7, as well as the maximum pulse width detector 56 of each of channels 50, can be replaced by a network that is responsive to the first signal which exceeds the threshold level of the threshold detector.

What is claimed is:
1. Apparatus for scanning a field of view and enabling spectral information from a point source of optical radiation in the field to be derived comprising first and second displaced detector means for the radiation, means having a narrow instantaneous field of view for optically scanning the field of view onto the first and second detector means, means including the scanning means and the first detector means for providing a first optical path wherein different wavelengths of the source are convoluted so they are imaged onto the first detector means at different times during the scan of the field of view and for providing a second optical path wherein a wavelength of the source is imaged on the second detector means at a time during a scan that differs from the relative time when the same wavelength from the source is imaged on the first detector means by the first optical path even though the source angular position in the field of view is approximately the same for both of the optical paths.

2. The apparatus of claim 1 wherein the same portions of the field of view are simultaneously imaged on both of the detector means.

3. The apparatus of claim 1 further including means responsive to optical radiation respectively imaged on the first and second detector means via the first and second optical paths for deriving an indication of the amplitude versus wavelength variation of the source.

4. The apparatus of claim 1 further including means responsive to optical radiation respectively imaged on the first and second detector means via the first and second optical paths for deriving a signal having an amplitude versus time variation that is correlated with the amplitude versus wavelength variation of the source.

5. The apparatus of claim 4 wherein the first optical path includes a dispersion means.

6. The apparatus of claim 2 wherein the first optical path includes a dispersion means.

7. The apparatus of claim 6 wherein said second detector means is responsive to approximately only monochromatic energy of the source at said wavelength and the first detector means is responsive to a substantial band of wavelengths of the source.

8. The apparatus of claim 2 further including means for distinguishing between point sources and nonpoint sources imaged on the first and second detector means.

9. The apparatus of claim 8 wherein each of the first and second detector means includes a multiplicity of separate, spaced detector elements, and means responsive to the relative amplitude of energy impinging on the elements of the second detector means for passing a signal that is a replica of the convoluted energy impinging on only one of the elements of the first detector means to a signal processing means.

10. The apparatus of claim 9 wherein the elements of the first and second detector means have corresponding geometric configurations, said means for passing including: means for indicating on which element of the second detector means is imaged the greatest amount of energy from a point source in the field, and means for passing the signal from the element of the first detector means corresponding with the indicated element of the second detector means.

11. The apparatus of claim 1 wherein the field of view is orthogonally scanned.

12. Apparatus for scanning a field of view and enabling spectral information from a point source of optical radiation in the field to be derived comprising dispersion means for the optical radiation, means having a narrow instantaneous field of view for optically scanning the field of view, first detector means responsive to energy of the source imaged by the scanning means for deriving a first signal having an amplitude versus time variation that is a convolution of dispersed spectral energy from the source and the dispersion means while the field of view is being scanned, second detector means while the field of view is being scanned, second detector means displaced by a predetermined distance from the first detector means, said second detector means being responsive to substantially only one predetermined wavelength of energy of the source imaged by the scanning means for deriving a second signal indicative of the occurrence time of the predetermined wavelength from the source being imaged on the first detector means, and means responsive to the first and second signals for deriving a third signal having an amplitude versus time variation that is correlated with the amplitude versus wavelength variation of the source.

13. The apparatus of claim 12 further including means for distinguishing between point sources and nonpoint sources imaged on the first and second detector means.

14. The apparatus of claim 13 wherein each of the first and second detector means includes a multiplicity of separate, spaced detector elements, and means responsive to the relative amplitude of energy impinging on the elements of the second detector means for passing a signal that is a replica of the convoluted energy impinging on only one of the elements of the first detector means to a signal processing means.

15. The apparatus of claim 14 wherein the elements of the first and second detector means have corresponding geometric configurations, said means for passing including: means for indicating on which element of the second detector means is imaged the greatest amount of energy from a point source in the field, and means for passing the signal from the element of the first detector means corresponding with the indicated element of the second detector means.

16. The apparatus of claim 12 further including means responsive to the third signal for comparing variations of the third signal with stored indications of the variations to derive a fourth signal indicative of predetermined point sources being imaged.

17. The apparatus of claim 16 further including means responsive to the fourth signal for deriving an indication of the angular position of the imaged predetermined point sources.

18. Apparatus for scanning a field of view and enabling spectral information from a point source of optical radiation in the field to be derived comprising first and second detector means for the radiation; means having a narrow instantaneous field of view for optically scanning the field of view to sequentially direct radiation for different scanned portions of the field of view onto the first and second detector means; optical dispersion means for the radiation; a first optical path for the radiation including each of: the dispersion means, the scanning means, and the first detector means; and a second optical path for the radiation including the scanning means and the second detector means; whereby the dispersion means and the scanning means cause a convolution of spectral energy from the source onto the first detector means so there is a displacement of the relative occurrence times during a scan of a wavelength of radiation from the source impinging on the first detector means and the second detector means.

19. The apparatus of claim 18 wherein the same portions of the field of view are simultaneously imaged on both of the detector means.

20. The apparatus of claim 19 further including means responsive to optical radiation respectively imaged on the first and second detector means via the first and second optical paths for deriving an indication of the amplitude versus wavelength variation of the source.

21. The apparatus of claim 18 further including means responsive to optical radiation respectively imaged on the first and second detector means via the first and second optical paths for deriving a signal having an amplitude versus time variation that is correlated with the amplitude versus wavelength variation of the source.

22. The apparatus of claim 18 wherein said second detector means is responsive to approximately only monochromatic energy of the source at said wavelength and said first detector means is responsive to a substantial band of wavelengths of the source.

23. The apparatus of claim 22 wherein the same portions of the field of view are simultaneously imaged on both of the detector means.

24. The apparatus of claim 23 further including means responsive to optical radiation respectively imaged on the first and second detector means via the first and second optical paths for deriving a signal having an amplitude versus time variation that is correlated with the amplitude versus wavelength variation of the source.

25. The apparatus of claim 22 further including means responsive to optical radiation respectively imaged on the first and second detector means via the first and second optical paths for deriving a signal having an amplitude versus time variation that is correlated with the amplitude versus wavelength variation of the source.

26. The apparatus of claim 18 further including means responsive to optical radiation respectively imaged on the first and second detector means via the first and second optical paths for deriving a signal having an amplitude versus time variation that is correlated with the amplitude versus wavelength variation of the source.

27. The apparatus of claim 18 further including means for distinguishing between point sources and nonpoint sources imaged on the first and second detector means.

28. The apparatus of claim 27 wherein each of the first and second detector means includes a multiplicity of separate, spaced detector elements, and means responsive to the relative amplitude of energy impinging on the elements of the second detector means for passing a signal that is a replica of the convoluted energy impinging on only one of the elements of the first detector means to a signal processing means.

29. The apparatus of claim 28 wherein the elements of the first and second detector means have corresponding geometric configurations, said means for passing including: means for indicating on which element of the second detector means is imaged the greatest amount of energy from a point source in the field, and means for passing the signal from the element of the first detector means corresponding with the indicated element of the second detector means.

30. The apparatus of claim 18 further including means responsive to the energy impinging on the first and second detector means for deriving an indication of the amplitude versus spectral content of the source.

31. In an apparatus for enabling a point source of optical radiation to be identified and analyzed for spectral content, first and second arrays of optical radiation detecting elements, each of said arrays including a multiplicity of closely spaced optical radiation detecting elements, the elements of the first and second arrays having the same geometrical relationship, means for simultaneously imaging the same optical images on corresponding elements of the first and second arrays, the spacing between adjacent ones of said elements of one array being less than the length of the imaged point source so that a point source imaged between adjacent elements of one array is detected by the adjacent elements, and dispersion means in the optical path between the source and at least one of the arrays.

32. The apparatus of claim 31 further including means responsive to the relative amplitude of energy impinging on the elements of the second array for passing a signal that is a replica of the convoluted energy impinging on only one of the elements of the first array to a signal processing means.

33. The apparatus of claim 32 wherein said means for passing includes means for indicating on which element of the second array is imaged the greatest amount of energy from a point source in the field, and means for passing the signal from the element of the first array corresponding with the indicated element of the second array.

34. In combination, first and second relatively stationary, displaced optical detectors, means for scanning approximately the same field of view simultaneously onto each of said detectors so that first and second optical paths are respectively provided from the fields of view of the first and second detectors, a dispersion means in at least the first optical path, the second detector being responsive only to monochromatic optical energy from the second optical path.

35. In an apparatus for enabling a point source of optical radiation to be identified and analyzed for spectral content, an array of closely spaced optical radiation detecting elements, means for imaging optical radiation sources on the array, said elements having a length in one direction no greater than the length of a point source imaged on the array, the spacing between adjacent ones of said elements being less than the length of the imaged point source so that a point source imaged between adjacent elements is detected by the adjacent elements, and a dispersion means in an optical path between the source and array.

36. In an apparatus for enabling a point source of optical radiation to be identified, a linear array of closely spaced optical radiation detecting elements, means for imaging optical radiation sources on the array, said elements having a length in one direction no greater than the length of a point source imaged on the array, the spacing between adjacent ones of said elements being less than the length of the imaged point source so that a point source imaged between adjacent elements is detected by the adjacent elements, means for scanning a field of view onto said array at a direction substantially at right angles to the direction of the linear array, signal processing means responsive to signals derived in response to radiation imaged on the elements for indicating which element is responsive to a point source, the signal processing means including: pulse width discriminator means responsive to each of said elements, and means for identifying more than two adjacent elements simultaneously responsive to radiation from the source, said pulse width discriminator means and means for identifying preventing any of said more than two adjacent elements and any pulses having durations in excess of a predetermined duration from being indicated as being responsive to a point source.

* * * * *